Dec. 1, 1970 R. E. SMITH 3,543,451
ACCESSORY FOR MACHINE TOOLS
Filed Oct. 26, 1967
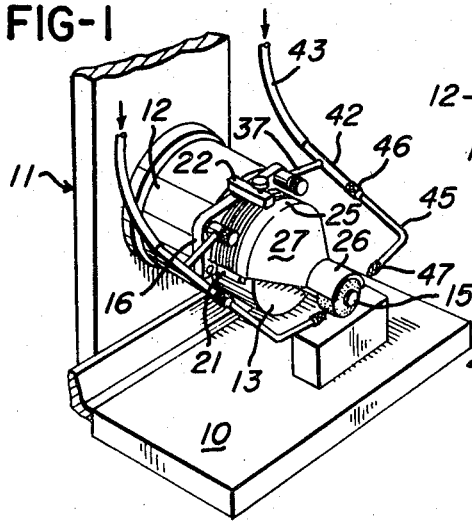
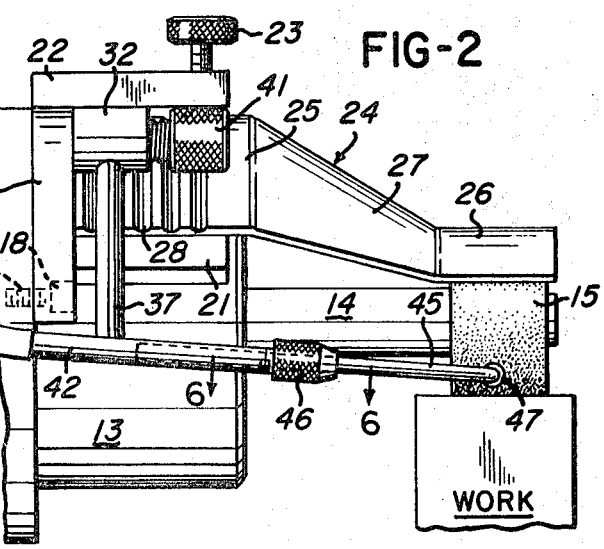
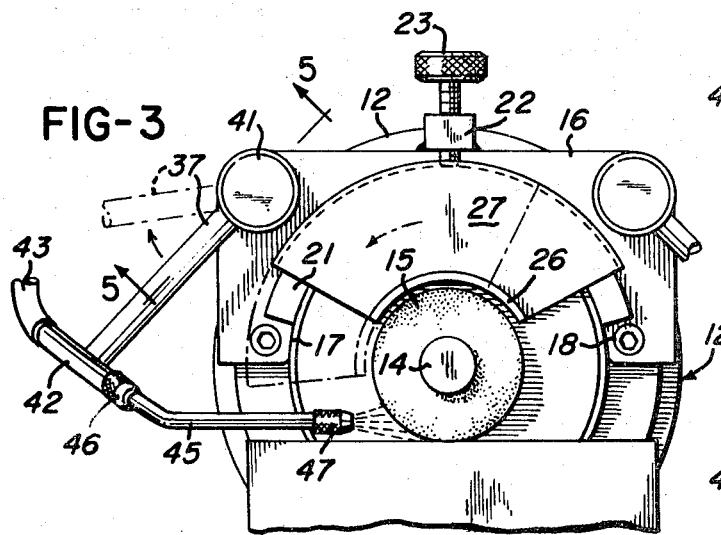
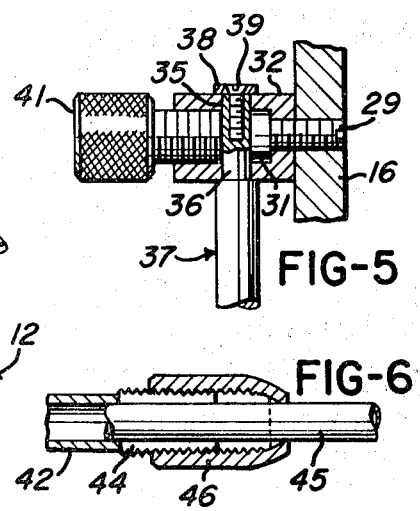
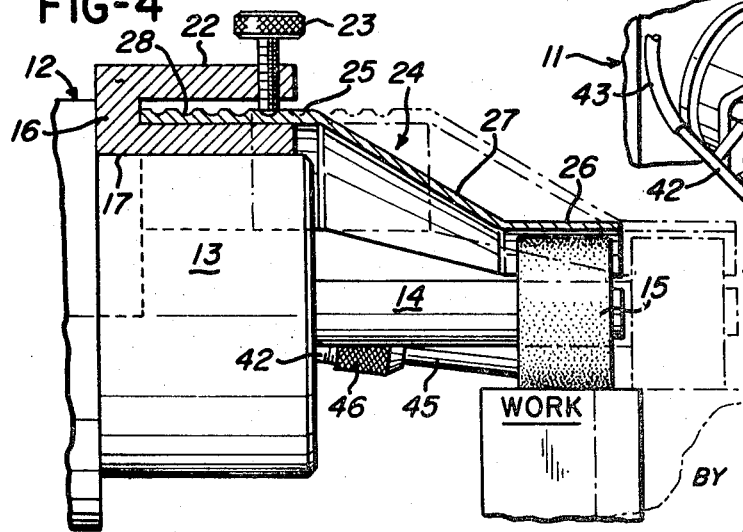
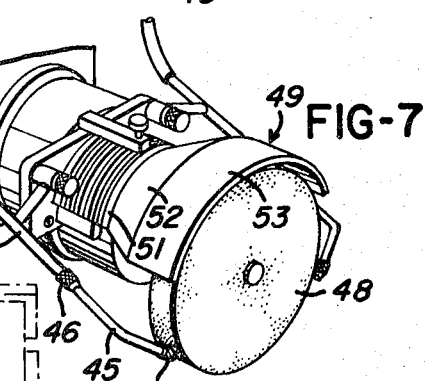
INVENTOR
ROBERT E. SMITH
BY *Jerome P. Bloom*
ATTORNEY

United States Patent Office 3,543,451
Patented Dec. 1, 1970

3,543,451
ACCESSORY FOR MACHINE TOOLS
Robert E. Smith, Dayton, Ohio, assignor to Day/ton Progress Corporation, Dayton, Ohio, a corporation of Ohio
Filed Oct. 26, 1967, Ser. No. 678,323
Int. Cl. B24b 55/02, 55/04
U.S. Cl. 51—267                                         15 Claims

ABSTRACT OF THE DISCLOSURE

A machine tool attachment comprising a tool guard member displaceable in plural senses for flexibility of use and application and incorporating, in a preferred embodiment, coolant spray nozzles which are adjustable in conformance to and in correspondence with changing positions or the variable configuration of the related tool guard.

---

This invention relates to machine tool accessories and, more particularly, to an assembly attachable to a grinder or any other machine unit which incorporates a cutting tool. In its preferred embodiment it provides means defining a most versatile shield for the working area of the cutting tool and affords a unique means for supplying a fluid spray to such area for cooling, lubricating, wetting and like purposes.

Similar devices of the prior art are relatively inflexible in form and application. The more effective these prior art devices have been in respect to covering a cutting tool, the less desirable they have become to the machine operator in respect to visibility and accessibility of the applied work. Moreover, their adaptability to different work environments has been extremely limited. Further, they have not afforded spray devices which could function with any marked degree of efficiency. The spray devices as heretofore known offer limited opportunity of directionally controlled discharge and, for that matter, incorporate no concept of use complementary to that of a tool guard within the scope and capabilities achieved by the present invention.

The limited adaptability and inflexibility of application which is inherent in prior devices of the nature described limits their efficiency and, in many instances, leads to personal injury and damaged work, as the operator finds it necessary or desirable to by-pass their use due to visibility problems or inaccessibility of the work with the guard in place.

The present invention, in contrast, provides a device which can be quickly mounted to any frame in an optimal position in reference to a cutting tool and provides a tool guard having portions displaceable in different senses to achieve optimal safety and working efficiency for the machine operator. It further incorporates in a preferred embodiment a simple but highly effective spray device having relatively universal adaptability.

A primary object of the invention is to provide a machine tool accessory in the nature of a unitary tool guard assembly which is economical to fabricate, most efficient and satisfactory in use, adaptable to a wide variety of applications and unlikely to cause difficulties in use.

Another object of the invention is to provide a machine tool accessory offering maximum protection to the machine operator, which accessory is readily adjustable for an inspection of a workpiece and to accommodate varying work requirements.

A further object of the invention is to provide a machine tool attachment having a guard cover for a working tool which is adjustable in plural senses to suit changing working requirements.

Another object of the invention is to provide a guard accessory for a machine incorporating a cutting or forming tool which embodies spray nozzles for cooling, lubricating and like purposes and in which the nozzles are subject to an extension, retraction and rotary adjustment in a manner to obtain an infinitely variable control of their direction and to adapt them to changing tools and changing tool positions.

Still another object of the invention is to provide a machine attachment in which a tool guard is quickly and easily adjustable for inspection purposes and to suit changing work requirements, the guard being adjustable to a plurality of longitudinally displaced positions and further adjustable in a rotary angular sense in each such longitudinal position of adjustment.

A still further object of the invention is to provide a machine attachment in which a tool guard is adjustable relative to a base and is quickly and easily removed for replacement to suit the particular work requirement.

An additional object of the invention is to provide a machine tool attachment having guard and spray features incorporated in a single assembly substantially universally attachable to grinding and like machines and incorporating structural features enabling adjustability to adapt the assembly to changing work requirements, it being an attendant object in this connection to provide for use or assembly, or both, of the guard and spray components singly or in combination with one another.

Still another object of the invention is to provide a unitary attachment device for machine tools including a tool guard and spray components which need not be detached during machine set-up, these components being displaceable in a manner fully to expose the machine tool working area while being retained in a connected relation to the attachment body and being similarly displaceable back to a working position as desired for the particular work requirement.

An additional object of the invention is to provide a machine tool accessory of the nature and possessing the particular advantageous structural features and means and mode of application herein described.

With these and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein some but not all the various possible embodiments of the invention are illustrated, FIG. 1 is a fragmentary generally schematic view, in perspective, of one embodiment of the invention which is mounted to the frame of a grinding machine and disposed in cooperative relation to a grinding wheel;

FIG. 2 is an enlarged side elevation of the structure shown in FIG. 1;

FIG. 3 is an end view of the structure of FIG. 2, one of the spray nozzles illustrated being shown in fragmentary form;

FIG. 4 is a view like FIG. 2, parts being shown in longitudinal section and illustrating their displacement capabilities;

FIG. 5 is a fragmentary view in longitudinal section, taken substantially along 5—5 of FIG. 3;

FIG. 6 is a fragmentary view in longitudinal section, taken substantially along the line 6—6 of FIG. 2; and FIG. 7 is a view similar to FIG. 1 showing a tool guard in accordance with a second form of embodiment of the invention.

Like parts are indicated by similar characters of reference throughout the several views.

As illustrated in the drawings, a machine tool equipped for grinding provides a work table 10 positioned forwardly of a machine frame 11. A cylindrical drive housing 12 mounts in and extends through the frame 11 to project perpendicular thereto and to overlie the table 10. A bushing 13 partly received in the outer end of the housing 12 provides a rotary mounting for a spindle 14. The latter projects coaxially of housing 12 and has fastened to its outer end a grinding wheel 15. As is conventionally provided, in the course of machine operation the spindle 14 is energized to cause the attached wheel to rotate. When this takes place, the wheel may exert an abrading action upon any work which may be held thereto. The work may be supported in reference to the wheel in any suitable manner. The manner in which this may be done is variable and optional to suit the particular application. Therefore, it will not be further described since it is not per se critical to an understanding of the present invention. In any event, irrespective of the manner in which the work is held to the grinding wheel, it is under the control of a machine operator who must constantly keep the grinding process under observation. It is noted, moreover, in many instances the work must at one time or another be manually controlled by the operator. Desirably, therefore, the operator must be protected against possible injury from accidental contact with the rotating grinding wheel, from flying segments of a possible break in the grinding wheel, from dust and grit generated by the grinding process and like debris.

Moreover, it is at times essential to discharge upon the grinding wheel or upon the grinding wheel and the applied work a fluid to achieve cooling, lubricating, wetting or like function. Guard means and spray means for these purposes are, in accordance with the instant invention, comprised in the unitary accessory device here shown attached to the grinding machine.

Referring to FIGS. 1 to 6, in its illustrated form, embodiment of the invention comprises base plate 16 which in this instance has a generally rectangular configuration. At what may be considered its lower edge, the plate 16 is cut to form therein a semicircular recess 17 enabling the plate to have a surface which conforms to and may seat on the upper surface of the bushing 13. As so installed, the plate 16 may be placed in abutting relation to the outer end of the housing 12 and made fast thereto by bolts 18. The latter are inserted through openings in the plate and screwed into tapped recesses 19 in the adjacent face of housing 12.

Integrally fixed on the outer face of the plate 16 in rimming generally coextensive relation to the recess 17 is an outwardly or forwardly projecting member 21. The member 21 terminates at either end just short of the bottom edge of the plate 16 and in the portion of the plate immediately following each end is an opening in the plate to accommodate one of the bolts 18. The member 21 thus has an arcuate configuration corresponding to a longitudinal segment of a tubular cylinder. As will be obvious, in an installed position it is concentric to both the bushing 13 and the tool spindle 14. In the function of the member 21, it provides a bearing and support surface as will be further described.

Permanently secured to the central portion of the upper edge of the plate 16, as by welding, is a rigid arm 22. The arm 22 is positioned in a vertical plane which includes the center of the recess 17. Moreover, it projects forwardly from the plate 16 in a sense parallel to the axis of the underlying tool and in overlying spaced relation to the arcuate segment 21. Threaded through the outer end of the arm 22, in a vertically dependent sense, is a set screw 23 the head of which is uppermost in reference to the arm. It is noted that in this instance the arm 22 is approximately coextensive in length with the underlying segment 21.

A tool guard 24 is in a cooperable, separable relation to the base plate 16 and the member 21 by virtue of having a circularly arcuate inner end portion 25 which is adapted to overlap, conform to and bear on the upper surface of the arcuate segment defined by the member 21. It is releasably held thereon by a pressured engagement thereof by the set screw 23 as particularly evidenced in FIG. 3 of the drawings. The opposite or outer end of the tool guard 24 is formed as another arcuate portion 26 concentric to the same axis as the inner end portion 25. The end portions 25 and 26 are interconnected by an integrated intermediate section 27, the configuration of the latter corresponding to a segment of a cone. As installed, the outer end portion 26 is disposed in the work area, being adapted to position in concentric closely spaced relation to the grinding wheel 15. In conjunction with the intermediate section 27, the end portion 26 serves a shielding function. The tool guard 24 thus comprises a base portion 25 bearing on and supported by the arcuate segment 21 and, integral therewith, the relatively projected successively disposing portions 27 and 26 by means of which the tool guard portion 26 may be caused to reach and to position in a partly surrounding relation to the spindle 14 and grinding tool 15. As mentioned previously, the upper surface of the support member 21 thus provides a bearing surface for the tool guard since the curvature of the end portion 25 conforms thereto and is freely movable thereon in either an axial or rotary sense, or both. This, of course, is in absence of a detent pressure being applied to the guard through the medium of an appropriate adjustment of the set screw 23. Formed in the upper surface of the end portion 25 is a series of longitudinally spaced grooves 28. These grooves are coextensive in length with the arcuate extent of the end portion 25. Moreover, each groove is adapted to receive the lower end of the set screw 23 as it defines different longitudinal positions of the tool guard 24. Further, in each of these positions of the guard, the latter is infinitely adjustable in a rotary sense to the extent permitted by the length of the grooves. As will be obvious, with the set screw 23 retracted, this allows for a selective positioning of the tool guard in reference to the support segment 21 in both longitudinal and rotary sense. When the appropriate position of the guard is achieved to place the end portion 26 in its desired position referenced to the grinding wheel 15, tightening of the screw in the underlying groove 28 locks the guard in the selected position. Of course, the advancing movement of the screw into the groove forces the end portion 25 of the guard into a close frictional contact with the upper surface of the support segment 21.

At each of what may be considered its upper corners, the base plate 16 has installed therein a bolt 29 (FIG. 5) the head 31 of which is positioned in a forwardly projecting spaced relation to the plate. The head of each bolt 29 is contained in a sleeve 32 rotatably mounting on the bolt by virtue of a through bore 33 defined by an internal flange in one end through which the bolt passes to engage in the plate 16.

Intermediate its ends and immediately outward of the contained head 31 of the bolt 29, each sleeve 32 is formed with a transverse through opening 35. The latter receives therethrough the reduced end 36 of a shaft 37. The transverse opening 35 is somewhat oversize relative the reduced shaft end 36 and thus in absence of restraint the shaft per se has a freedom of both rotary and axial motion with and relative to the related sleeve. However, a retention plate 38 exteriorly of sleeve 32 is held to the reduced end 36 by a screw 39 to inhibit axial movement of the shaft in reference to the sleeve. Further, the interior of the sleeve 32 is threaded to receive in its outer end the threaded shank of a bolt 41 the head of which is enlarged in reference to the bore of the sleeve and knurled. Thus, the reduced shaft end 36 is interposed between the inner end of the bolt 41 and the head 31 of the bolt 29. Accordingly, on advancing the bolt 41 inwardly of the threaded sleeve, its inner end may be applied to frictionally hold the shaft 37 against the bolt head 31 in a selected position of rotation within the sleeve. This also achieves a frictional lock of the related sleeve in its then set position.

At its end opposite its reduced portion 36 each shaft 37 has rigidly connected at right angles thereto a tube 42. At what may be considered its inner open end, each tube 42 is adapted to have coupled thereto a flexible conduit 43 which leads from a suitable source of cooling, lubricating or wetting fluid. The opposite or outer end of each tube 42 is externally threaded and split to provide it with expansible and contractable segments 44. A further tube 45 has one end telescopically slip-fit within the split outer end of the tube 42 and has slidable thereon a tubular nut 46. The nut 46 is adapted to threadedly engage about the split outer end of the tube 42 and to thereby compress its segments 44 into a frictional engagement with the telescoped end of the related tube 45. The outermost end of each tube 45 is bent to a generally right-angled position and terminates also in a split extremity which has threaded thereon a nozzle device 47.

There is therefore mounted to base plate 16, as indicated, a pair of fluid conducting assemblies, one disposing to either side of and projecting forwardly to substantially embrace the tool guard 24. The bent outer ends of tubes 45 are such as to place the nozzles 47 at opposite sides of what may be considered the tool or working area occupied by the grinding wheel 15.

It will be seen that changes in axial location of the grinding wheel may be readily accommodated by loosening the collar nuts 46 and readjusting the telescoped relation of the tubes 45 in reference to the tubes 42 to achieve the desired position of the nozzles, whereupon the nuts may then be retightened. Changes in the angular direction of the spray discharged from the nozzles is obviously possible on loosening the nuts 46 and turning the tubes 45 on their axes to the desired attitude and reclamping them in the changed position. Bodily rotation of an entire nozzle assembly may be achieved on loosening bolt 41 whereupon the related shaft 37 may be rocked in a pivoting motion with or relative to the related sleeve 32. Then tightening of the bolts 41 clamps the parts of the spray devices in their new relative position of adjustment.

Accordingly, in use of the invention embodiment, the plate 16 may obviously be fixed to a stationary part of a machine tool in any convenient manner in order that its integrally connected arcuate segment 21 may dispose concentrically of the tool axis, in this instance the grinding wheel 15. With screw 23 released, the tool guard 24 is adjusted longitudinally of the tool axis in order to position end portion 26 in the desired position about the working area of the tool. Set screw 23 may then be turned down to partially engage in an aligned groove 28. The tool guard may then be displaced rotationally to adjust the end portion 26 for the most effective interception of injurious dust and grit while permitting the machine operator optimal visibility and accessibility to the grnding wheel and the applied work. Following this, set screw 23 may be turned down additionally to clamp the tool guard in a fixed relation to the support segment 21. As described, the spray apparatus is similarly adapted to the particular working environment by effecting the desired rotational or rocking adjustment of the shafts 37 about their axes and by suitably extending or retracting and rotationally positioning the tubes 45 so that the spray discharge will be best directed to the work area. In this last case, of course, tightening of the bolts 41 and of the collar nuts 46 is suitably effected to hold the parts in their selected positions of adjustment.

As is obvious, for inspection purposes, one may simply loosen the set screw 23 to rotationally adjust the tool guard to fully expose the working area of the tool and enable a full view of the critical area of the grinding wheel and the applied workpiece. Similar adjustments may be made in preparing for a new machine set up and in conjunction with this the spray apparatus may be similarly rocked out of a working position. However, it will be seen that in all instances the tool cover and the spray apparatus may remain connected to the base support structure of the accessory and they may be quickly and easily relocated in working position when needed. Under such circumstances, it is totally unlikely the components will be damaged or lost. In this connection, it is quite advantageous that the screw 23 may enable a quick repositioning of the tool guard without the need for fully withdrawing the screw from its detenting relation to the guard. If in a new machine set up the grinding tools may be axially displaced from the previous position in reference to the mount of the accessory, a corresponding longitudinal adjustment of the tool guard 24 may be simply effected in the manner as described by first retracting set screw 23 sufficiently to clear the grooves 28, then moving the tool guard longitudinally, as from the full line position of FIG. 4 to the dotted line position thereof, and then readvancing the screws to engage in a newly aligned groove 28. Of course, appropriate rotational adjustment of the guard 24 may be readily achieved also.

It is a feature of the invention that the accessory may be provided with substitute tool guards 24 so that the unit may be adapted for use with varying tools of different size and diameter. Thus, one may substitute for the guard 24 other guards which differ in arcuate extent of either end or in length, or both. For example, the embodiment shown in FIG. 7 is applied to a tool incorporating a grinding wheel 48 substantially larger in diameter than the grinding wheel 15. To suit this particular situation, a substitute tool guard 49 is applied. This guard functions in connection with the support segment 21 and the related apparatus in the same manner as the guard 24. However, its inner arcuate end portion 51 is in this case formed on a radius which is smaller than that on which the outer arcuate end portion 53 is formed in order that it is enabled to partly surround the wheel 48. In this instance also, the arcuate extent of the portion 53 is increased to retain a degree of protective sealing like that achieved by the end portion 26 applied about the wheel 15. As in the first instance, a conical section 52 integrally connects the inner end portion 51 and the outer end portion 53 of the guard.

Operation and adjustment of the tool guard 49 is achieved in the manner as described in connection with the guard 24.

Of course it is obvious that the outer end portion of the guard may be varied dependent on the particular application to which it may be desired that the accessory be applied.

Correspondingly, the spray nozzle assemblies may be adjusted in conformance with the nature and character of the cutting or forming devices of the machine tools to which the accessory is applied to maintain the most advantageous flow of fluids. It will be seen that irrespective of the nature of the guard 24 that the spray nozzles are so contrived and mounted that they can adapt to the particular situation at hand.

It may thus be readily seen that the invention provides a unique accessory for machines which incorporate various cutting or forming tools, which accessory is simple in form yet enables the achievement not only of safety for the operator but enables the operator to work with optimal efficiency and accuracy in his movements. Moreover, the fact that the accessory provides simple mediums for applying various fluids to the tools and the applied work in a relatively universal manner lends further uniqueness to the invention embodiments.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. An accessory for machines incorporating cutting and like tools including a base portion for attachment to the machine, means on said base portion defining a bearing surface, a tool guard having an end portion seated for relatively free displacement on said bearing surface and an opposite end projecting to form a protective shield to partly surround the tool working area and means included on said base portion to locate said tool guard in selective positions of adjustment on said bearing surface and relative to said tool.

2. An accessory as in claim 1 characterized by said locating means providing means for accomodating displacement of said guard in both axial and rotary senses and means to fix said guard to establish said shield in any selected position of adjustment on said bearing surface.

3. An accessory according to claim 1 characterized by said bearing surface having an arcuate configuration, the first said end portion of said tool guard seating for relatively free movement on said bearing surface in both a rotary and an axial sense and said locating means including means to establish the position of said guard on said bearing surface on an adjustment of said guard in a sense axially of said bearing surface and to releasably fix said tool guard relative to said bearing surface, said fixing means being arranged to accommodate selective positions of rotary adjustment of said guard and to fix the same in any position of rotary adjustment.

4. An accessory acording to claim 1 characterized in that the first said end portion of said tool guard has an inner surface which conforms to and bearingly seats on said bearing surface and an outer surface having formed thereon a plurality of guides which are longitudinally spaced and extend transverse to the longitudinal extent of said bearing surface, said guides forming a part cooperating with said locating means for establishing said guard in a selective position of adjustment, said locating means including means on said base adjustable into and out of cooperative engagement with a guide selected by a relative adjustment of said tool guard in a sense longitudinally of said bearing surface, said last named means providing means accommodating a movement of said guard in a sense transverse to said bearing surface and clamping said guard to said bearing surface in its selected position of adjustment thereon.

5. An accessory according to claim 1 characterized in that said first end portion of said tool guard is formed as a segment of a cylinder and has guides thereon extending from one side to the other, said segment being formed and related to said bearing surface for motion thereon in a plurality of senses, said segment being adjustable in one sense and guided by said bearing surface for rotating motion in another sense generally transverse to said one sense, and said locating means being operable in conjunction with a guide to retain said segment in a position of adjustment in said one sense while accommodating its adjustment in said rotary sense, said locating means also including means for fixing said segment in any selected position of adjustment on said bearing surface.

6. An accessory for machines incorporating cutting and like tools including a base portion for attachment to the machine, means on said base portion defining a bearing surface, a tool guard having an end seated on said bearing surface and an opposite end projecting to form a protective shield to partly surround the tool working area, and means included on said base portion to locate said tool guard in selective positions of adjustment on said bearing surface and relative to said tool, characterized in that said bearing surface is arcuate in configuration in a sense transverse to the axis of the related tool, the said one end of said tool guard having a complementary bearing surface on the portion thereof which seats to said first mentioned bearing surface and having in the upper surface thereof a series of longitudinal spaced arcuately extending grooves, an arm fixed to said base portion and extending in overlying relation to said bearing surface mounting clamping means, said clamping means being adapted to be selectively projected in one of said grooves to define a selected position of longitudinal adjustment of said guard and adapted to selectively guide the guard for rotary displacement in the selected position of longitudinal adjustment prior to a fixed clamping thereof.

7. An accessory for machines incorporating cutting and like tools including a base portion for attachment to the machine, means on said base portion defining a bearing surface, a tool guard having an end seated on said bearing surface and an opposite end projecting to form a protective shield to partly surround the tool working area and means included on said base portion to locate said tool guard in selective positions of adjustment on said bearing surface and relative to said tool, characterized by said base portion having means defining an arcuate recess which is rimmed by a relatively projected plate segment having the shape of a section of a tube which is circular in cross-section, an arm fixed to said base portion and extending therefrom in overlying spaced relation to said segment, set screw means in said arm and adjustable to and from said segment, the surface of said segment adjacent said set screw means providing said bearing surface, said tool guard being supported by said segment to extend therefrom and be displaceable thereon in both longitudinal and rotary senses, said set screw means being included in said locator means and being adjustable to frictionally hold said tool guard to said segment, said inner end of said tool guard having a plurality of recesses formed therein to be selectively aligned with said set screw means which may be engaged therein to clamp the tool guard in a selected position of adjustment relative said segment.

8. An accessory for machines incorporating cutting and like tools including a base portion for attachment to the machine, means on said base portion defining a bearing surface, a tool guard having an end seated on said bearing surface and an opposite end projecting to form a protective shield to partly surround the tool working area and means included on said base portion to locate said tool guard in selective positions of adjustment on said bearing surface and relative to said tool, wherein said bearing surface has an arcuate configuration, the first said end of said tool guard seating on said surface with freedom of relative motion in rotary and longitudinal senses, said locating means having the form of means to releasably fix said tool guard relative to said base portion in selected positions of adjustment, the first said end of said tool guard having an arcuate configuration, an inner surface thereof being formed to conform to and seat on said bearing surface and an outer surface thereof being formed with a series of longitudinally spaced apart circumferential guides, said guides forming a part of said locating means, said locating means further including fixing means on said base portion adjustable into and out of cooperative engagement with a circumferential guide selected by relative longitudinal adjustment of said tool guard, said fixing means guiding said guard in relative rotary motion and being adjustable to clamp said tool guard to said bearing surface.

9. An accessory according to claim 8, characterized in that said fixing means is extensible into and retractable from cooperative engagement with said guides, said tool guard being released in a retracted position of said fixing means for removal and replacement as desired.

10. An accessory according to claim 8, characterized in that the first said end of said tool guard is formed as a segment of a cylindrical surface, said guides extending from side to side of said segment whereby said tool guard may be released from said fixing means for removal and replacement by turning of the tool guard out of cooperative relation with said fixing means.

11. An accessory according to claim 1, characterized in that said tool guard is constructed for cooperation with said locating means to provide for relative rotary adjustment of said guard to an infinitely variable number of positions and for relative longitudinal adjustment of said guard to a limited number of predetermined positions.

12. An accessory according to claim 1, wherein said locating means includes a part movable in advancing and retracting motions respectively to fix said guard upon said bearing surface and to release it for bodily and rotary longitudinal motions, said part having an intermediate position in which it guides rotary adjustment of said guard and limits said guard against longitudinal adjustment.

13. An accessory for machines incorporating cutting and like tools including a base portion for attachment to the machine, means on said base portion defining a bearing surface, a tool guard having an end seated on said bearing surface and an opposite end projecting to form a protective shield to partly surround the tool working area and means included on said base portion to locate said tool guard in selective positions of adjustment on said bearing surface and relative to said tool, wherein the machine has means defining a tool axis, said accessory including a body having said base portion to mount to a machine frame or the like, said base portion having an arcuately cut surface which in a mounted position of the body is positioned concentric to the tool axis and allows for passage of a tool spindle, said body having further a projected portion of arcuate configuration concentric to said arcuately cut surface, said projected portion defining said bearing surface, said locating means including an arm fixed to said body and extending therefrom in overlying spaced relation to said projecting portion, said arm mounting fixing means adjustable toward and from said projecting portion, the tool guard being supported by said body to extend therefrom in generally parallel relation to the tool axis and for displacement relative thereto in both longitudinal and rotary senses in accordance with the location requirements of the work, the inner end of said guard conforming to and seating on said projected portion of said body, said fixing means being adjustable to frictionally hold said tool guard to said projected portion, the first said end of said tool guard having a longitudinal series of circumferential grooves selectively aligned with said fixing means by longitudinal displacement of said guard relative to said body, engagement of said fixing means in a selected groove defining a selected position of longitudinal adjustment of said guard and guiding the guard for rotary displacement in said selected longitudinal position of adjustment.

14. An accessory according to claim 1, characterized by spray nozzles attached to said base portion and extending therefrom in substantially embracing relation to said tool guard, the tips of said nozzles being bent inward toward the tool area at a location adjacent the said opposite end of said tool guard, said nozzles being adjustable in conformance with selected positions of adjustment of said tool guard to direct a spray into a portion of the tool area uncovered by said tool guard while maintaining the location of the nozzle tips relative to the said opposite end of the tool guard.

15. An accessory according to claim 14, wherein the machine has defined therein a tool axis, said spray nozzles being attached to said base portion through laterally projecting arm means extending divergently of the tool axis and mounted for relative rocking motion, cooling fluid conducting tube means carried by said arm means lying in generally parallel relation to the tool axis and in forwardly projected relation to said base portion, said spray nozzles being represented as ends of said tube means and being bent inward toward the tool axis at the tool area, said spray nozzles being extensible and retractable relatively to said tube means and rotatable angularly thereof.

References Cited

UNITED STATES PATENTS

| | | | |
|---|---|---|---|
| 375,821 | 1/1888 | Hyde et al. | 51—267 |
| 2,518,939 | 8/1950 | Ross | 51—268 X |
| 775,708 | 11/1904 | Norton | 51—267 |
| 2,301,264 | 11/1942 | Emery | 51—268 X |

JAMES L. JONES, Jr., Primary Examiner

U.S. Cl. X.R.

51—268